United States Patent
Tocci

[11] 3,715,295
[45] Feb. 6, 1973

[54] DISPOSABLE ELECTROPHORESIS UNIT

[75] Inventor: Paul M. Tocci, Miami, Fla.

[73] Assignee: TLC Corporation, Miami, Fla.

[22] Filed: Sept. 2, 1971

[21] Appl. No.: 177,284

[52] U.S. Cl.............204/180 G, 204/180 S, 204/299
[51] Int. Cl. ................................................B01k 5/00
[58] Field of Search....204/180 G, 180 R, 180 S, 299

[56] References Cited

UNITED STATES PATENTS

| 3,371,027 | 2/1968 | Paglia et al. | 204/299 |
| 3,407,133 | 10/1968 | Oliva et al. | 204/299 |
| 3,432,414 | 3/1969 | Rand | 204/180 G |
| 3,494,846 | 2/1970 | Arquembourg | 204/180 G |

Primary Examiner—John H. Mack
Assistant Examiner—A. C. Prescott
Attorney—Meredith P. Sparks

[57] ABSTRACT

This invention relates to an expendable electrophoresis test unit for particle separation in a buffered system using direct current. The buffer is in semi-solid form which can be prepackaged with the unit, or dispensed from a tube at the time of use. The semi-solid buffer is prepared by mixing a liquid buffer solution with a thickening agent, preferably fumed silica. The unit itself is made of inexpensive disposable materials.

10 Claims, 6 Drawing Figures

PATENTED FEB 6 1973
3,715,295
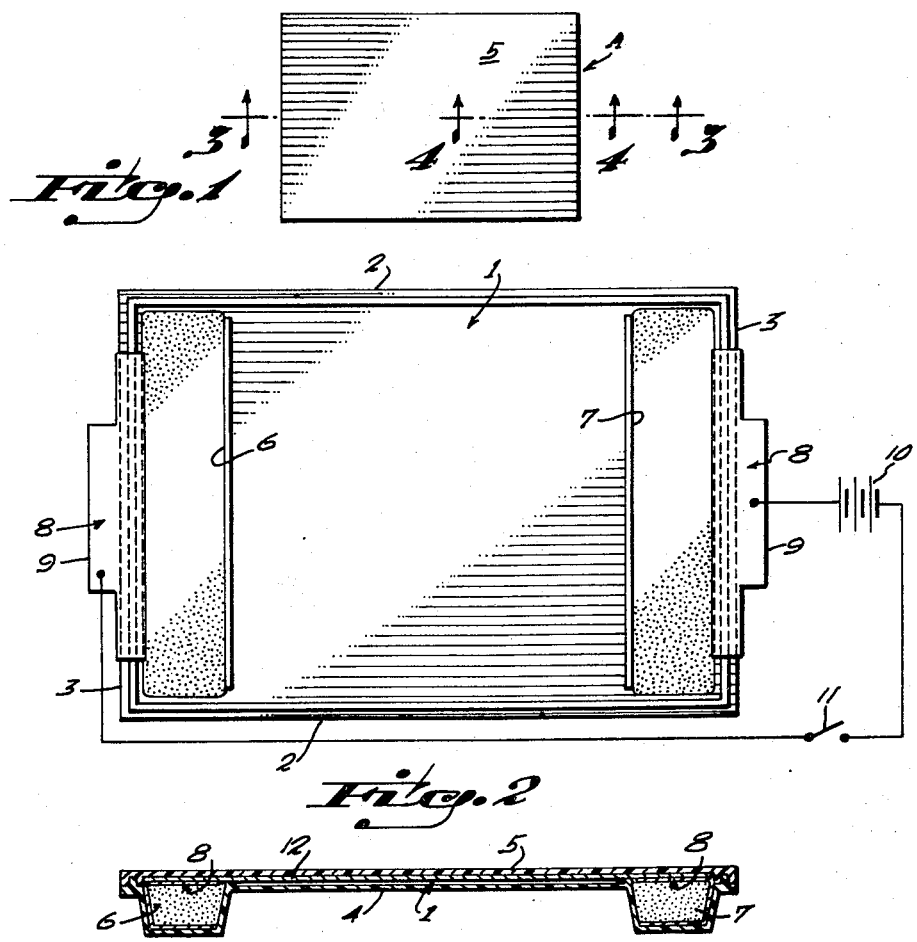
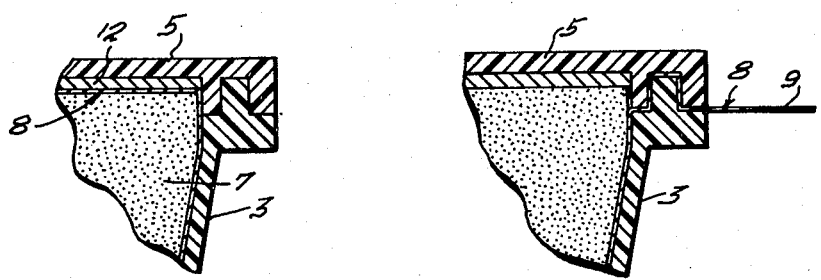
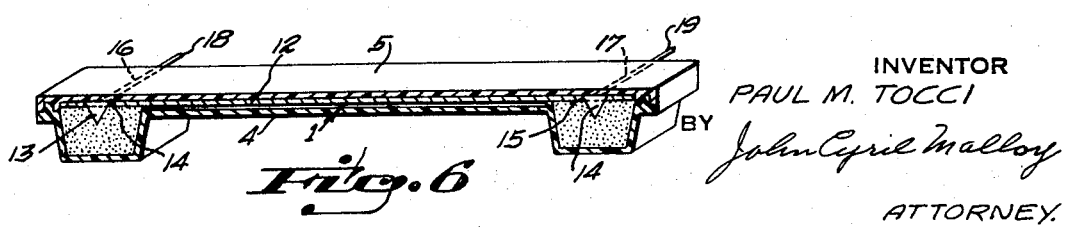
INVENTOR
PAUL M. TOCCI
BY John Cyril Malloy
ATTORNEY.

DISPOSABLE ELECTROPHORESIS UNIT

This invention relates to the separation of mixtures by differential migration of components through a transport medium in an electric field, and more particularly to an expendable electrophoresis test unit for particle separation in a buffered system to which direct current is applied.

The separation and consequent grouping of materials by electrophoresis occurs within a buffered liquid support medium, wherein those particles of a test sample that have a greater charge will migrate at a faster rate and further in a given time than those of a lesser charge. After particle grouping, identification of the materials in the test sample is determined by means known in the art.

The technique of electrophoresis involves the use of electricity, specifically, a constant potential difference or a constant amperage across a medium to move compounds according to their electric charge. Many media have been used as the support, e.g., paper, agar-gel, cellulose acetate strips, polyacidamide gels, starch blocks, thin layer plates and others. Whatever the media, buffers are used as electrolytes at each end, the anode end and the cathode end. The buffers may be formulated according to many formulas and are tailored to particular separations in particular media of certain specific groups of compounds by varying not only their pH but their tonicity. These formulations are well known in the field and are used extensively.

One of the drawbacks of electrophoresis has been the use of these buffers as liquids and the location in the many different shapes of chambers now on the market. The liquid buffers are subject to evaporation with resultant loss of effectiveness due to pH changes and changes in tonicity due to increased salt production. It is not difficult to change a buffer gone bad, but it is a bothersome time-consuming chore. Also when one wishes to analyze a different type of compound one must change buffers and clean the tank, wicks and chamber dividers. During the course of electrophoresis heat is evolved and many elaborate schemes have been devised to maintain constant temperature to keep radial diffusion to a minimum.

The buffer solutions are probably the greatest variable in the technique of electrophoresis. The problems of technique when liquid solutions are used as buffers are such that fairly elaborate mechanical systems are ordinarily required. In case of a gel media, for example, the direction of travel of the current necessitates a wick from the liquid buffer solution to the gel.

I have now discovered that most of the objections to the use of electrophoresis with liquid buffer solutions can be overcome by the use of pre-mixed, semi-solid buffers dispensed from a closed container such as a plastic or metal tube. The semi-solid buffer solution is dispensed directly into the chamber or well of the electrophesis tank so that the hands need not touch the buffer. Also, only as much material as is needed is put into the chamber so that there is much less waste of expensive reagents. If the containers are relatively airtight and light-tight, they can be stored in a refrigerator or freezer without extensive degradation for extended time periods. The containers can be small and many can be stored in a very small area. Large batches of mixtures can be made at one time and stored. With uniform buffers available, results obtained at different times and in different places will be more comparable than is now possible. The use of inexpensive, expendable, self-contained electrophoresis equipment will enable the relatively small clinic to use diagnostic procedures which heretofore have been fairly well restricted to use by large commercial and institutional laboratories.

In a preferred embodiment of my invention, the buffer solution is suspended in particles of fumed silica. When the proportions of the fumed silica and buffer solution are correct the buffer in semi-solid form is then put into dispensers which may be of the syringe type or the collapsible tube type. As a general indication of the approximate thickness, an amount of the mixed buffer solution is mixed with an amount of a thickening agent such that the beaker or other vessel in which mixing takes place can be turned upside down without the semi-solid product spilling out. The proportions of the ingredients will vary widely with the type of buffer mixtures employed. Generally, the amount of thickening agent varies from about 1 to about 15 percent by weight of the buffer solution used. Acid and alkaline emulsifiers, solidifiers, thixotropic agents, gelling agents and dispersing agents may be used also to form the semi-solid or to improve the characteristics of a particular mixture. In this way volatile chemicals which are used as buffers may be stored for many months so as to be ready for instantaneous use.

According to my invention, the buffer solution in semi-solid form is placed in each of a pair of spaced wells in a tank of light weight disposable material, a support medium wetted with the buffer is positioned at the top of the tank, electrodes for connecting to a power source for direct current are provided at each well in electrical contact with the buffer contained in the wells in order to provide passage of current through the semi-solid buffer placed in the wells and at the top of the tank to cause charged particle migration for particle group identification.

The container is preferably made of plastic, for example, Mylar. The lid and body of the container may be made of the same or different type of plastic. For example, the lid may be made of a clear plastic such as an acrylic plastic, with the base portion of the container made of a sturdy polystyrene. In the latter instance the inexpensive disposable tank having a pair of integrally formed spaced wells at each end is prepackaged with the buffer in semi-solid form placed in the wells and the unit is covered by a thin sheet made preferably of metal foil or plastic to act as a seal unit the tank is ready for use.

A support medium, comprising for example, paper, a cellulose acetate strip, a thin layer plate on a plastic backing, or agar gel is positioned at the top of the tank. A buffer can be spread on the support medium, at the time of use, for example, by means of a wiper, or by blotting with a towelette. The sample to be separated or identified is then applied to the support medium which is in contact with the semi-solid buffer in each end of the well. The lid is then fitted onto the tank.

The buffer in semi-solid form can be stored in a separate container for use when needed. Alternately, the chamber can be prepackaged with the semi-solid buffer already placed in the wells of the tank.

In the latter instance the invention, comprising an inexpensive disposable tank having a pair of integrally formed spaced wells at each end, is prepackaged with buffers in semi-solid form, which buffers are covered by a thin sheet made preferably of metal foil or a thin plastic sheet to act as a seal until the tank is ready for use.

The top for the tank may be inert plastic or may consist of a support medium, for example, of paper, a cellulose acetate strip, or a thin layer plate on a plastic backing, on which is spread at the time of use an appropriate buffer to wet the medium. This can be done, for example, by means of a wiper, or by blotting with a towelette. Alternatively, a wet support media may be used such as agar-gel or polyacidamide gel. The sample to be separated or identified is then applied to the medium and a lid fitted onto the tank. The container may be cooled by placing in a separate specially designed container, or by other means.

In a preferred embodiment of my invention the top snaps onto a ridge around the tank, such that each end of the support media is in contact with the semi-solid buffer in each end of the well. The tank may vary in size and shape. When the tank is rectangular in shape the lid which acts as a closure may be hinged to the tank along one of the edges and a raised rib along the remaining edges adapted frictionally to engage the lid along its unhinged edges to close the tank to the atmosphere.

An electrode of suitable electrical conducting properties is provided for retention within each of the buffer wells as a foil. The foil is shaped to substantially fit within the wells. Each foil electrode may have an outwardly extending tab portion which is adapted to protrude from the well. The tabs or the electrodes are connected to a suitable source of direct current, preferably through a switch.

In another embodiment of my invention the power supply is connected to two electrodes which are adapted to pierce the buffer chambers through predetermined holes in the cover of each well. An electrode may be used on each side of the top in the shape of a long knife-edge, each wedge being connected to the power source. Electrodes such as nichrome or platinum wire may also be used. The electrodes may also be painted or printed in the buffer well.

Any power supply which can deliver from 10 to 5,000 volts and from one to 100 milliamperes of direct current may be used. A special adaptor for the electrodes may be necessary for each different size of tank used.

In order to electrophoretically separate materials by differential migration in an electrically conductive buffer system subjected to flow of current therethrough utilizing the disposable equipment of this invention, the test sample, which is subject to electrophoretic particle separation, is deposited on the buffered support media. The semi-solid buffer may be placed in the chambers of the tank by the supplier, or alternatively may be dispensed into the chambers by the user. The test sample is placed at predetermined positions on the support media. The support will rest in electrical contact with the semi-solid buffer in the wells. To start electrophoresis direct current is applied through the components of the system. This is accomplished by connecting the electrodes which are provided with the wells to a suitable current source. The electrical potential is applied through the system for a predetermined length of time, after which a suitable method of analysis is employed to locate and identify the electrophoretically separated constituents of the test sample. It will be understood that the direction and rate of particle migration are functions of the magnitude of the field, the charge on the particles, the pH of the buffer, and other factors such as particle size, viscosity and the like.

A fuller understanding of the invention may be had by referring to the following description and claims, taken in conjunction with the accompanying drawings.

FIG. 1 is a plan view of the electrophoresis unit of the present invention.

FIG. 2 is an enlarged plan view of the apparatus of FIG. 1 with the lid removed.

FIG. 3 is a horizontal sectional view taken along lines 3—3 of FIG. 1.

FIG. 4 is a typical partial sectional view.

FIG. 5 is a partial sectional view identical to FIG. 4 showing a foil electrode in the operable position.

FIG. 6 is a horizontal sectional view, similar to FIG. 3, in perspective, illustrating a modified form of electrodes.

Referring now particularly to the drawings wherein like reference characters indicate like parts, the electrophoresis apparatus shown in FIG. 1 is generally indicated by letter A and includes a substantially rectangular electrophoresis chamber 1 having sidewalls 2 and endwalls 3 surrounding are extending upwardly from base portions 4 (see FIG. 3). The chamber in FIG. 3 is shown with a lid 5 resting on the top portion thereof. The top portion of the walls 2 and 3 thus provide complementary engageable surfaces.

FIG. 2, an enlarged view of the unit A of FIG. 1, shows the chamber 1 with lid 5 removed. Positioned within the chamber 1 are a pair of buffer vessels 6 and 7. The vessels 6 and 7 are open at the top and positioned parallel to the end walls 2 of the chamber 1. Buffer in semi-solid form is placed within the vessels 6 and 7. It is understood that the buffer may be provided by the manufacturer with the apparatus or may be added by the user. A foil electrode 8 of suitable conducting properties is provided for retention within each of the buffer vessels 6 and 7 and is shaped to substantially fit within the vessels 6 and 7 as seen in FIG. 2. Each foil electrode has an outwardly extending tab portion 9 which is adapted to protrude from the chamber 1. The tabs are connected to a suitable source of direct current 10 through switch 11. The tabs 9 are illustrated in their extended outfolded operable position in FIG. 2.

In FIG. 3 a lid 5 is illustrated in position upon the chamber 1 to effectively enclose the chamber to air to avoid substantial evaporation therefrom. A sheet 12 positioned across the top of the two wells 6 and 7 has an intermediate support portion adapted to receive and hold a suitable medium for electrophoresis. The medium is in electrical contact with the semi-solid buffer in buffer vessels 6 and 7.

FIG. 4 shows, in an enlarged fragmentary manner, a portion of the lid 5 in place upon the chamber 1 and shows the foil electrode folded back over the semi-solid solvent 7 in the well. The foil electrodes on either side is folded back when not in use or for storage purposes.

FIG. 5 is a view similar to FIG. 4 and shows the foil electrode 8 in its folded out operable position whereby it resides between the complementary engaging wall surfaces of the lid 5 and chamber 1.

FIG. 6 illustrates a modified form of electrodes in which a pair of wedge shaped knife edge electrodes 13 and 14 are held in holes 14 and 15 in the sheet 12 and pierce the respective buffer vessels 6 and 7. Leads 16 and 17 extend outwardly of the apparatus from the respective electrodes 13 and 14 and are provided with plug means 18 and 19 for connection to a power supply as illustrated in FIG. 3.

The above-described electrophoresis unit can, according to this invention, be used to separate and/or identify ingredients of numerous mixtures. Examples include the separation of serum proteins and lipo proteins, and in the separation of hemoglobins, the various hemoglobins from which diagnosis can be made for several anemias. Amino acids, sugars and other small molecules can also be separated by this method. Many enzymes besides lactate dehydrogenase are also examined by using this equipment. Lactic acid dehydrogenase isoenzymes aid in the diagnosis of myocardial infections and liver disease.

Various modifications and variations of the present invention may be made without departing from the spirit of the discovery or the scope of the appended claims.

What is claimed is:

1. A disposable electrophoresis test unit comprising, a tank having integrally formed means defining a pair of spaced wells for holding a buffer in semi-solid form therein;

a buffer in substantially irreversible semi-solid form placed in each of said spaced wells;

a support media positioned at the top of the tank and in electrical contact with said semi-solid buffer in the wells; and means including electrodes within said wells for making electrical contact with said buffer, and connected to a suitable source of direct current to provide passage of current through said buffer and support media in order to move particles according to their electrical charge and permit charged particle migration for particle group identification thereof.

2. The electrophoresis test unit of claim 1 including a closure therefor.

3. The electrophoresis test unit of claim 2 wherein said closure is a wrapper of plastic or metal foil.

4. The electrophoresis test unit of claim 2 wherein the top of said tank is rectangular in shape and said closure is a lid hinged to said tank along an edge thereof, and a raised rib along the remaining edges of said tank is adapted frictionally to engage said lid along its unhinged edges to close said tank to the atmosphere.

5. The electrophoresis test unit of claim 1 wherein said semi-solid buffer is a suspension of a buffer solution in particles of a thickening agent forming a semisolid substantially irreversible by heat.

6. The electrophoresis unit of claim 5 in which said thickening agent is fumed silica.

7. The electrophoresis test unit of claim 1 wherein said support media is a thin layer plate.

8. The electrophoresis test unit of claim 1 wherein said chamber is made of plastic.

9. The process of separating materials by electrophoresis using the electrophoresis unit of claim 1 which comprises depositing a test sample on said buffered support media which is in electrical contact with the semi-solid buffer in the wells of said unit, and applying direct current through the components of the system for a predetermined length of time to cause separation of the components of said materials by differential migration in the electric field.

10. The process of claim 9 wherein said components which are separated and identified by analytical means.

* * * * *